United States Patent [19]
da Costa

[11] 3,898,104
[45] Aug. 5, 1975

[54] CYLINDRICAL ELECTRICAL BATTERIES

[76] Inventor: João Baptista Pimenta da Costa, Rua Pinto 148 - 1°, Paco de Arcos, Portugal

[22] Filed: Jan. 15, 1973

[21] Appl. No.: 323,896

Related U.S. Application Data

[63] Continuation of Ser. No. 110,466, Jan. 28, 1971, abandoned.

[52] U.S. Cl.............................. 136/166; 136/107
[51] Int. Cl. .......................................... H01m 1/00
[58] Field of Search ............ 136/166, 102, 107, 111

[56] References Cited
UNITED STATES PATENTS

| | | | |
|---|---|---|---|
| 2,842,608 | 7/1958 | Querengässer et al. ............ | 136/111 |
| 3,315,285 | 4/1967 | Farmer ............................... | 204/49 |
| 3,376,166 | 4/1968 | Hruden .............................. | 136/107 |
| 3,420,714 | 1/1969 | Knight ............................... | 136/107 |
| 3,463,669 | 8/1969 | Jammet.............................. | 136/107 |
| 3,556,859 | 1/1971 | Ohki .................................. | 136/107 |

*Primary Examiner*—John H. Mack
*Assistant Examiner*—C. F. LeFevour
*Attorney, Agent, or Firm*—Larson, Taylor and Hinds

[57] ABSTRACT

A cylindrical electrical battery comprising a cylindrical electrical cell, an envelope for said cell, said envelope being comprised of an upper half shell of plastic insulating material and a lower half shell being adapted to receive the lower part of said cell and being provided at its base with a cup of conductive metal, said upper and lower half shells including cooperating sleeve portions slidably engagable to provide a water-proof and leak-proof fit between said upper and lower half shells.

3 Claims, 3 Drawing Figures

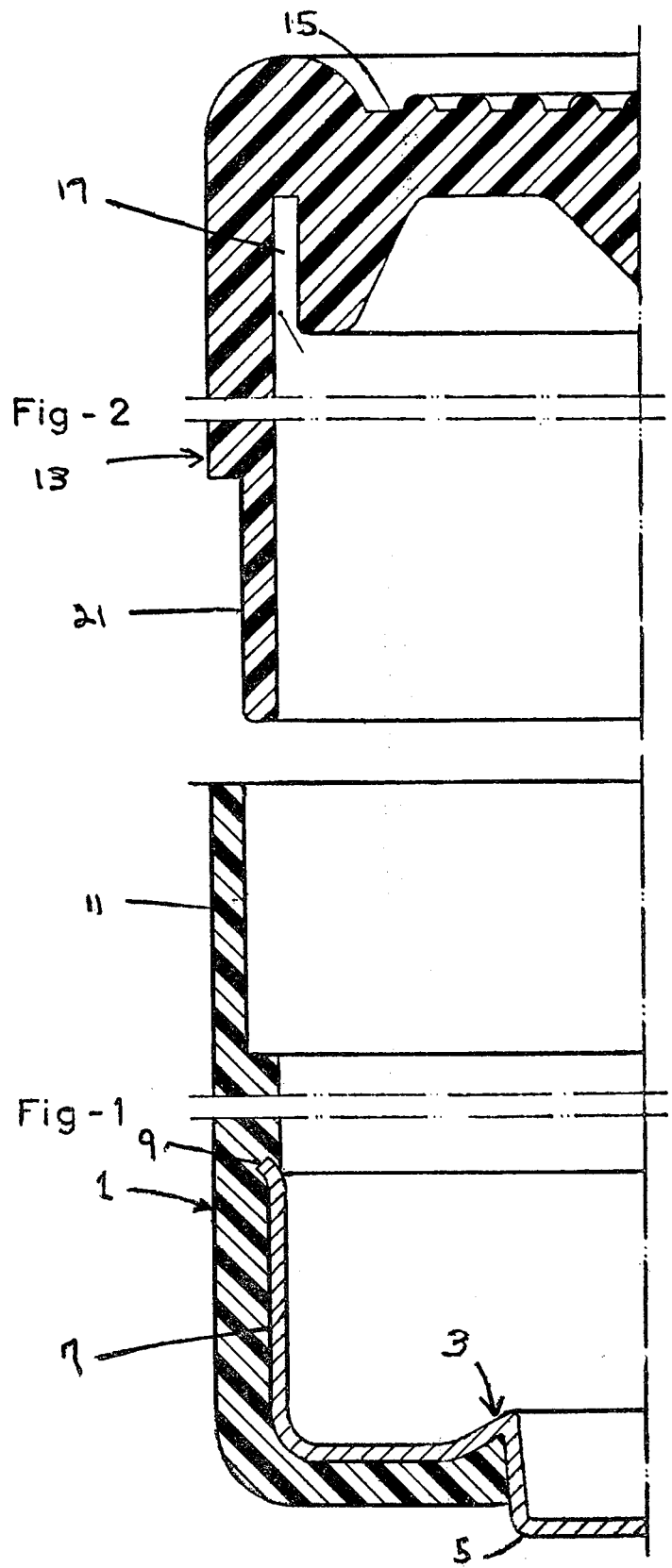

CYLINDRICAL ELECTRICAL BATTERIES

This is a continuation of application Ser. No. 110,466 filed Jan. 28, 1971, now abandoned.

This invention relates to electric batteries of the cylindrical type including an electrochemical cell having a zinc container as a negative electrode, i.e. cathode, and a carbon rod as a positive electrode, i.e. anode, disposed in the zinc container substantially along its longitudinal axis.

In use the electrochemical cells with which the present invention is concerned are contained in an envelope of insulating material and electrical current is collected at the extremities thereof by means of collectors. One of the collectors is of negative polarity and situated at the base of the cell and the other is of positive polarity and situated at the top of the cell.

The collector of negative polarity comprises a small piece of conductive metal such as tin plate or zinc placed at the bottom of the envelope and embedded therein. The collector of negative polarity is installed at the bottom of the envelope in any convenient manner. One method comprises inserting the collector during the molding of the envelope so that the external surfaces of the upturned extremities of the collectors are pressed into the lower walls and a portion of the bottom of the envelope in a manner that leaves the internal surface of the collector projecting slightly outwardly from the internal surface of the envelope. The ends of the upturned extremities of the collector are preferably bent into and embedded in the walls of the envelope.

Another method of installing the collector of negative polarity comprises molding the collector into position at the bottom of the envelope and then removing the peripheral surface of plastic on the collector to expose the internal surface of the collector at the bottom of the envelope.

The collector of positive polarity normally comprises a cap of conductive metal such as brass located on the top cover of the envelope. The top is of substantial thickness and the cap has a collar which is embedded in the thick top.

In the assemblage of these batteries the cell is introduced into the envelope and the bottom of the zinc container is forced onto the internal surface of the collector of negative polarity to insure negative electrical contact. The top of the envelope containing the cap is then introduced by squeezing the cap over the top end of the carbon anode thereby establishing positive electrical contact. The edge of the top is secured as by a suitable adhesive onto the top of the envelope that houses the zinc container.

One of the common problems associated with these types of electrochemical cells is the exudation that occurs particularly at the junction of the top corner with the top edge of the envelope where the adhesive connection is made. Any defective gluing of course precludes an effective seal.

Since it is desirable that the connecting junction of the two parts of the envelope be as far away as possible for the top part of the zinc container where electrolyte expansion takes place it has been proposed to make the envelope in one piece and to include in its top part of the envelope an internal annular groove at the periphery thereof for the receipt of the upper edges of the zinc container. This groove creates a sealing means and reduces the likelihood of electrolyte exudation.

Unfortunately, this latter type of envelope is not entirely without shortcomings with respect to insuring against leakage at the lower extremities of the battery. For instance, the possibility remains that under excessive pressure electrolyte may cross or bridge the junction between the upper edge of the zinc container and groove and migrate down between the cell and envelope to come out at the base of the envelope.

It is the object of the present invention, therefore, to provide an improved battery which possesses waterproof or leak-proof features for each of the extremities of the battery.

To this effect the battery of the invention includes a cylindrical envelope of plastic material comprised of two half shells each containing a water or leak-proof device described hereafter which half shells can be readily assembled and glued together. The invention will be further described with reference to the accompanying drawings wherein:

FIG. 1 is a sectional view of part of the lower half shell of the envelope;

FIG. 2 is a sectional view of part of the other half of the envelope; and

Figure 3:
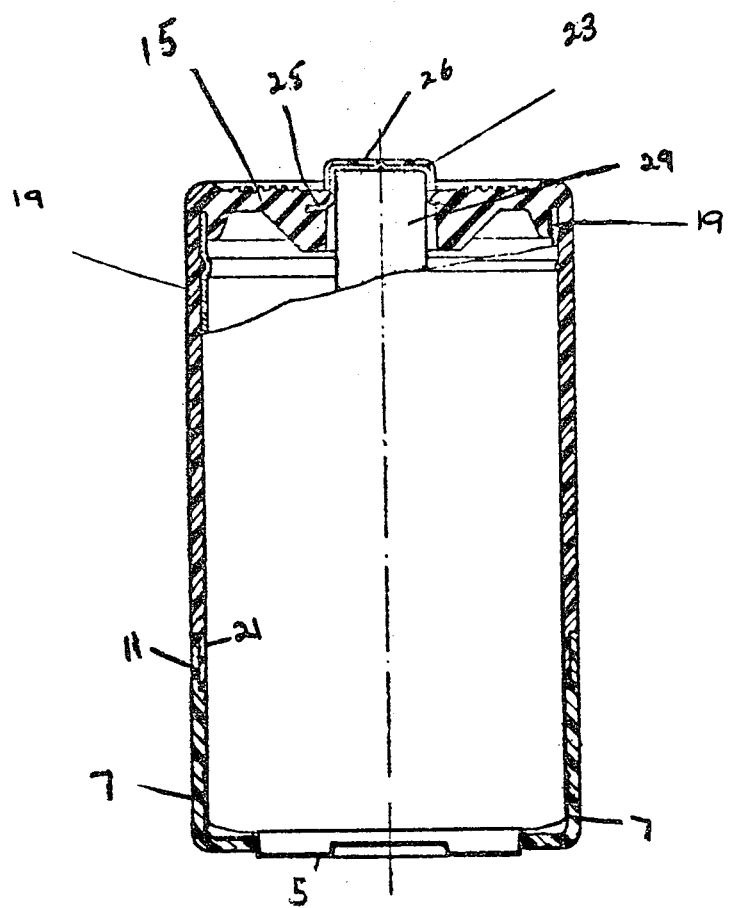
FIG. 3 is a perspective view of the assembled battery partially in section.

Referring to FIG. 1 the lower half shell, indicated generally as 1, is a cylinder of molded plastic insulating material such as polypropylene, polystyrene, etc., the bottom and sides of which have received during the molding process a cup indicated generally as 3 as a collector or negative polarity. The cup is constructed of tin plate or zinc and is composed of a central portion 5 which constitutes part of the base of the lower half shell and a peripheral extension 7. The peripheral extension 7 conforms in shape to the periphery of the wall and base portion of the lower half shell and is set therein so as to leave the internal surface of the extension sticking out slightly from the internal surface of the lower half shell. Advantageously, extension 7 contains an edge 9 which is bent toward and embedded into the walls of the lower half shell 1. The upper part of the lower half shell 1 is made thinner at a certain height to provide a sleeve 11.

Referring to FIG. 2, the upper half shell, indicated generally as 13, is a cylinder of molded plastic insulating material having an intergral top portion 15. The top portion 15 contains at its periphery a groove 17 for receiving the top edge of the zinc container 19 (see FIG. 3). The thickness of the groove 17 is slightly smaller than the thickness of the upper edge of the zinc container so as to form a tight fit upon insertion of the latter. The upper half shell 13 is further characterized by having a sleeve 21 in the lower section thereof. Sleeve 21 of the upper half shell 13 and sleeve 11 of the lower half shell 1 slidably cooperate one with the other to provide a water-proof or leak-proof fit between the upper and lower half shells.

Referring now to FIG. 3, the top 15 of the upper half shell has disposed substantially centrally therein a brass cap 23 having a collar 25 embedded in the plastic top 15. Preferably a second cap 26 of conductive metal is provided to fit over brass cap 23.

To assemble the battery of the present invention an electrochemical cell comprised of a cylindrical zinc container 19 as a cathode having electrolyte disposed therein and an elongated carbon electrode 29 positioned substantially along the longitudinal axis of said zinc container, is introduced into the lower half shell 1 so that the bottom of the zinc container comes into electrical contact with the collector 3 of negative polarity. A suitable adhesive is then applied to the internal surface of sleeve 11 and to the external surface of sleeve 21 and the upper half shell 13 placed over the top part of the inserted cell and slid downward in a manner that slidably engages the sleeves 21 and 11. Continued downward sliding of the upper half shell 13 introduces the upper edge of the zinc container into a tight fit within groove 17 which sliding motion terminates by the brass cap 23 covering the top of the carbon electrode 29. Thus, there is provided a battery possessing highly improved water-proof and leak-proof characteristics.

It is claimed:

1. A cylindrical electrical battery comprising a cylindrical electrical cell having a cylindrical container selected from the group consisting of tin plate and zinc, an elongated carbon electrode positioned substantially along the longitudinal axis of said container and an electrolyte in said container, an envelope for said cell, said envelope being comprised of an upper half shell of plastic insulating material and a separate lower half shell of plastic insulating material, said lower half shell being adapted to receive the lower part of said upper half shell and being provided at its base with a cup of conductive material, said upper and lower half shells each including cooperating sleeve portions of reduced radial cross-section relative to the remainder of the side walls of said half shells, said cooperating sleeve portions being slidably engagable with each other to provide a water-proof fit between said upper and lower half shells, the total radial cross-section of said sleeve portions when engaged being substantially equal to the radial cross-section of the remainder of the side walls of said shells, the top of said upper half shell including an internal annular groove at the periphery thereof for the receipt of the upper edges of the container and a cap of conductive metal arranged to fit tightly over the top of said carbon electrode and said cup of conductive material being comprised of a base portion and peripheral extensions conforming to the shape of the walls of said shells, said peripheral extension each containing an edge embedded in the adjacent wall of the lower half shell.

2. The cylindrical electrical battery of claim 1 wherein the cylindrical container is a zinc container.

3. The cylindrical electrical battery of claim 1 wherein the cap is of brass.

* * * * *